United States Patent [19]
Neuman

[11] Patent Number: 5,281,015
[45] Date of Patent: Jan. 25, 1994

[54] STORAGE CONTAINERS FOR FLAT, OBJECTS

[76] Inventor: Eli Neuman, 7800 Deering Ave., Canoga Park, Calif. 91304

[21] Appl. No.: 660,794

[22] Filed: Feb. 25, 1991

[51] Int. Cl.⁵ .................................................. A47F 1/04
[52] U.S. Cl. .................................. 312/9.15; 312/9.58; 312/191
[58] Field of Search ............... 312/13, 183, 185, 187, 312/191, 9.15, 9.12, 9.29, 9.33, 9.58, 9.61; 206/387

[56] References Cited

U.S. PATENT DOCUMENTS

| Re. 27,462 | 8/1972 | Gutierrez | 312/13 |
| 1,313,150 | 8/1919 | Wood | 312/191 |
| 4,609,231 | 9/1986 | Neuman | 312/13 |

*Primary Examiner*—Peter R. Brown
*Assistant Examiner*—Gerold Anderson
*Attorney, Agent, or Firm*—Thomas I. Rozsa; Dong Chen

[57] ABSTRACT

A storage container for a plurality of flat objects is disclosed. The container has apparatus for successively displaying a surface portion of each stored object so as to enable rapid visual scanning. The apparatus rotates successive objects from a first display position to a second position which displays the next successive object.

17 Claims, 13 Drawing Sheets

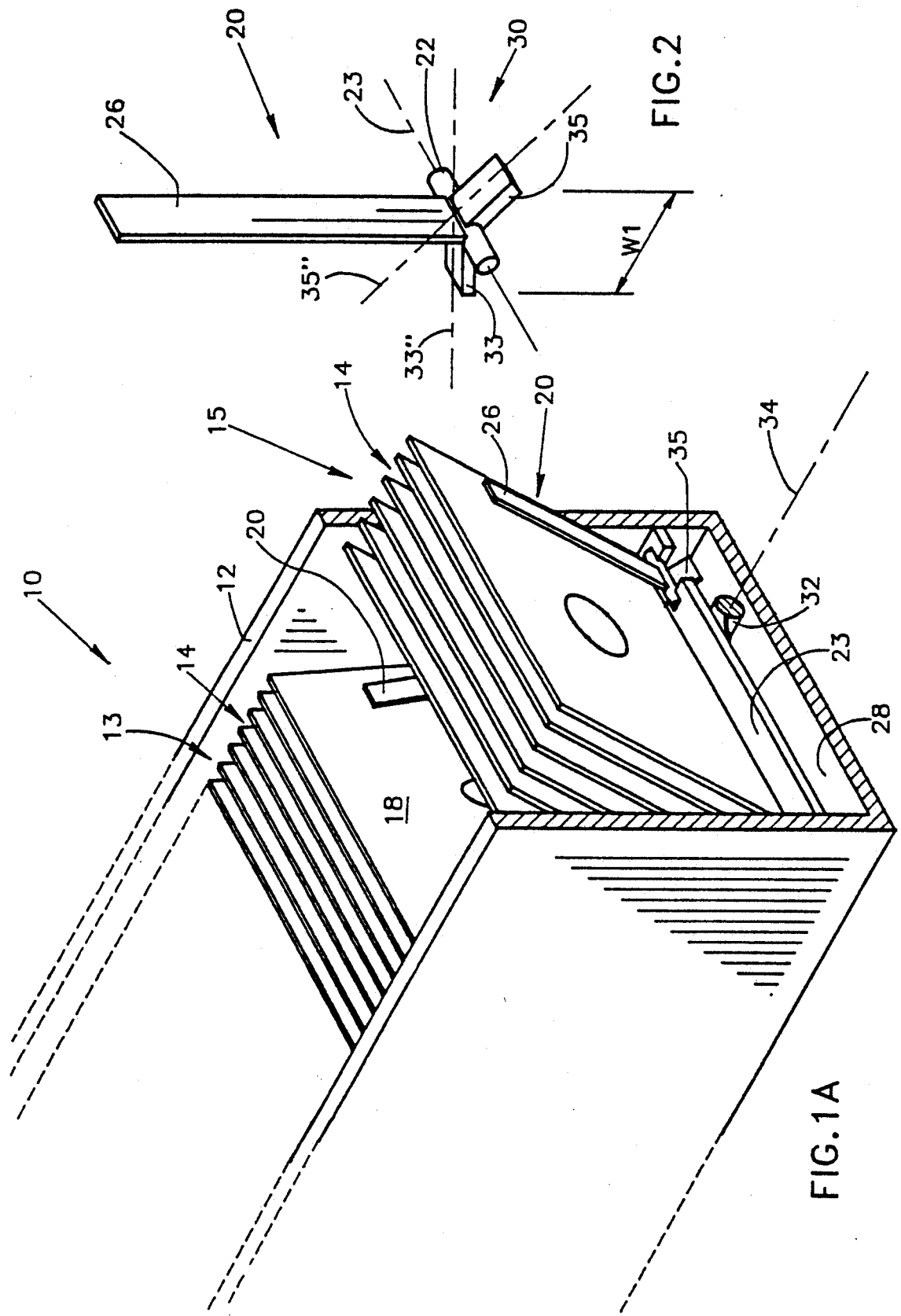

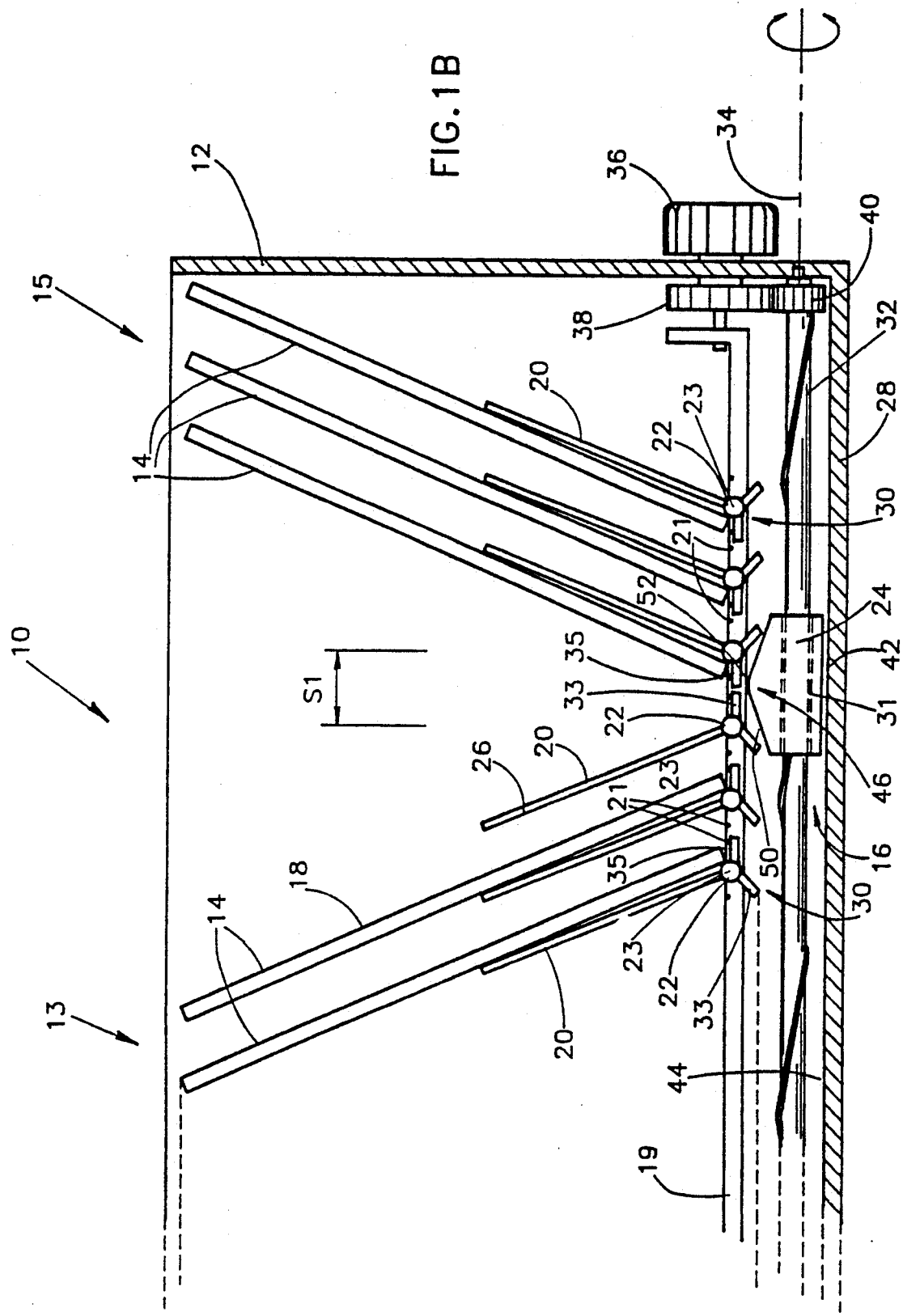

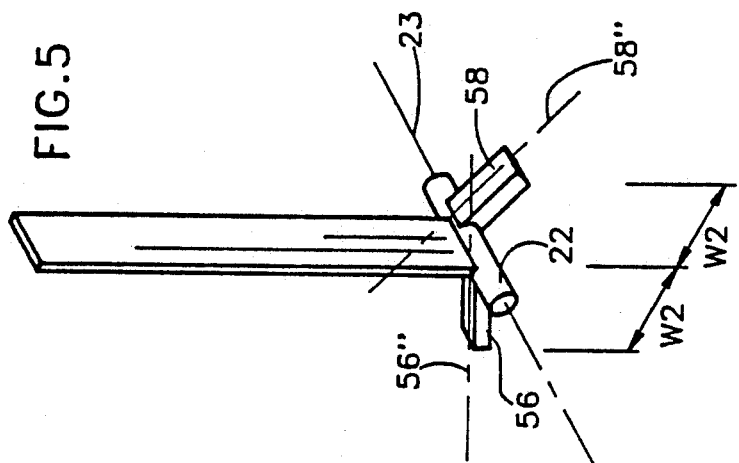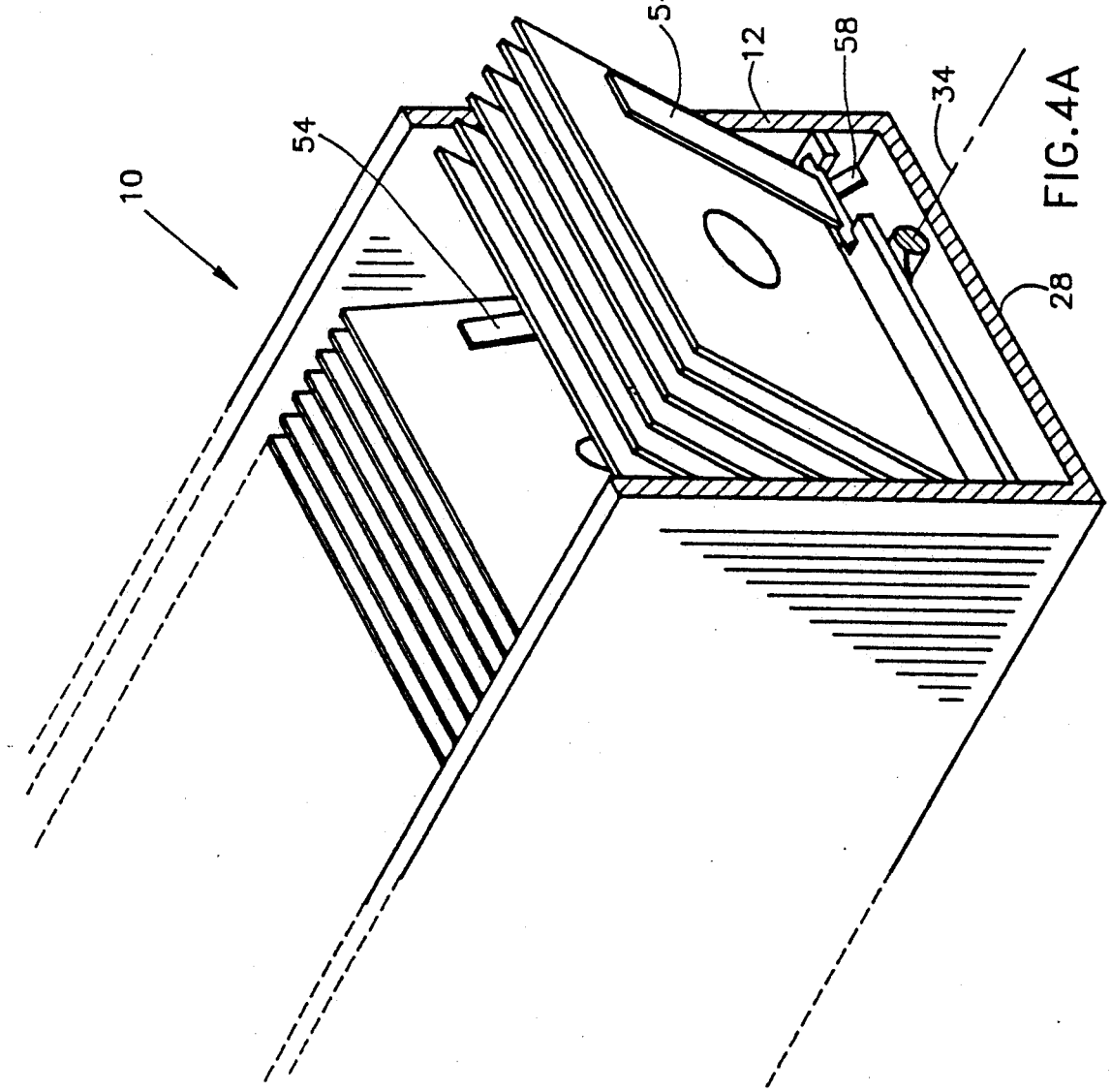

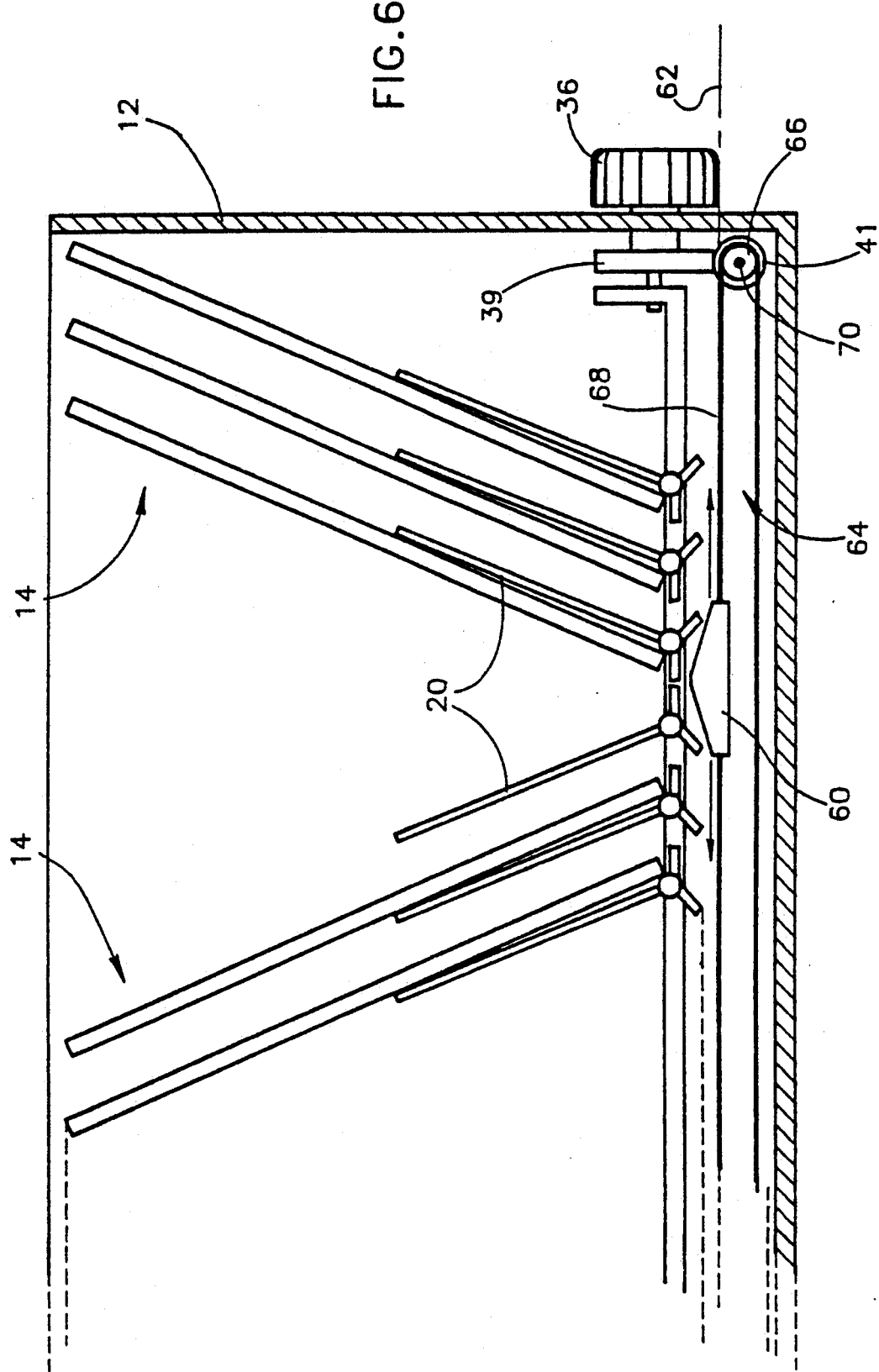

STORAGE CONTAINERS FOR FLAT, OBJECTS

FIELD OF THE INVENTION

The present invention relates to storage containers in general, and in particular, to storage containers for flat, objects, wherein the storage containers also have apparatus for displaying a selected object without having to remove that object from the container.

BACKGROUND OF THE INVENTION

Flat objects such as floppy diskettes, phonographic records and 'compact discs' are often kept in generally rigid, closable storage containers. These storage containers prevent mechanical damage to the stored objects, reduce the exposure of the objects to dust, and, in general, provide a convenient means of storing and transporting floppy diskettes and compact discs. The objects are stored parallel to each other, inclined at a small angle to the base of the container. Due to the relatively large number of objects that may be stored in a single container, e.g. about 20 or 30, searching for a particular diskette or compact disc may be tedious and time-consuming.

Described in U.S. Pat. No. 4,609,231 is a container for storing planar objects. The container enables a selected object to be rapidly located by lifting successive stored planar objects so as to display a portion thereof. To achieve this there is provided a rotatable camshaft extending along the length of the container, and a plurality of cams corresponding to a plurality of support arms for stored planar objects. The cams are spaced along the camshaft and are also spaced radially thereabout so that axial rotation of the camshaft causes successive lifting engagement of a single support arm by its corresponding cam so as to lift and expose a portion of the object on each support arm.

It would be advantageous to provide a means of displaying an entire surface portion of a stored object so as to more readily permit identification thereof. It would also be advantageous to provide a means of successively displaying stored flat objects by less complex means than those described in the above-referenced U.S. Patent.

U.S. Pat. No. 3,812,975 describes phonograph record holding apparatus including a plurality of pivotal record holding members which are constructed and arranged such that the forward tilt of an end one of the members is operative to cause the automatic forward pivoting of the remainder of the members. U.S. Pat. No. Re. 27,462 describes a photograph record rack having a frame and a plurality of spaced parallel axially pivoted record holding members. The holding members are constructed and arranged such that the tilting of one member is operative to cause the automatic pivoting of an adjacent holding member.

Disadvantages inherent in both of the above-described U.S. patents is that they provide no means for controlling the automatic successive tilting of adjacent, hitherto non-tilted holding members, and that the construction of both devices is inherently complex and may result in jamming thereof.

The following patents are also noted as describing storage apparatus for flat objects and including features of either static display of stored objects or individual manual pivoting of compartments for storing a plurality of flat objects or of single object compartments: U.S. Pat. Nos. 3,100,671; 3,556,620; 4,239,307; and 4,684,019.

SUMMARY OF THE INVENTION

The present invention seeks to provide a storage container for flat objects, wherein the container also has apparatus for successively displaying an entire surface portion of each stored object so as to enable rapid visual scanning thereof, thereby overcoming disadvantages of known art.

There is provided, therefore, in accordance with an embodiment of the invention, storage apparatus for flat objects including a container configured to hold a plurality of flat objects; and apparatus associated with the container for selectably rotating successive ones of the objects between first and second positions so as to display a selected surface of each successively rotated object.

Additionally in accordance with an embodiment of the invention, the apparatus for selectably rotating includes a plurality of spaced apart support elements mounted for rotation about a plurality of respective, parallel pivot axes, each the support element being configured to support a single flat object in either of the first or second positions; and apparatus for selectably engaging successive support elements so as to cause pivoting thereof about the pivot axes so as to rotate successive ones of the flat objects between the first and second positions.

Further in accordance with an embodiment of the invention, the container includes a base and the plurality of pivot axes are oriented generally parallel to the base, each support element defining a support portion extending generally away from the base and further defining a protrusion extending from the pivot axis towards the base, the apparatus for selectably engaging being operable to successively engage each protrusion so as to cause pivoting of each support element.

Additionally in accordance with an embodiment of the invention, the apparatus for selectably engaging includes an engagement element mounted for translation along an axis transverse to the pivot axes as to successively engage and cause pivoting of each support element; and apparatus for selectably displacing the engagement element along the transverse axis.

Further in accordance with an embodiment of the invention, the engagement element includes a movable cam member having an internally threaded bore and which is configured to engage each protrusion, and the apparatus for selectably displacing includes a drive screw mounted along the transverse axis and extending through the threaded bore so as to engage the cam; apparatus for rotating the drive screw; and apparatus for preventing rotation of the cam member about the drive screw so as to cause linear translation of the cam along the drive screw and thereby cause successive engagement of the protrusions of the support elements by the cam.

According to an alternative embodiment of the invention, the apparatus for selectably engaging includes an elongate rotatable member having first and second ends and mounted along an axis transverse to the pivot axes; and a helical screw member mounted onto the rotatable member so as to be rotatable therewith and configured to engage successive protrusions when the rotatable member is rotated.

According to yet a further embodiment of the invention, the movable member includes an elongate cam member mounted for movement along its longitudinal axis and defining a plurality of cam portions equal to the number of support elements and arranged along the cam member so as to successively engage and rotate predetermined support elements.

In accordance with an additional embodiment of the invention, protrusion of each support element is made of a magnetic material and the engagement element is a magnet.

In accordance with a further embodiment of the invention, the apparatus for successively rotating each of the objects between first and second positions includes apparatus for successively engaging the objects so as to cause successive rotation thereof.

BRIEF DESCRIPTION OF THE DRAWINGS

The present invention will be more fully understood and appreciated from the following detailed description, taken in conjunction with the drawings, in which:

FIGS. 1A and 1B are respective cut-away perspective and side views of storage and display apparatus for flat objects, employing a single cam mounted onto a drive screw and constructed in accordance with an embodiment of the invention;

FIG. 2 is an enlarged perspective illustration of a single support element used in the storage and display apparatus of FIGS. 1A and 1B;

FIGS. 4A and 4B are respective cut-away perspective and side views of storage and display apparatus for flat objects, similar to the apparatus of FIGS. 1A and 1B but employing support elements configured so as to permit closer spacing than that permitted by the support elements employed in the apparatus of FIGS. 1A and 1B;

FIG. 5 is an enlarged perspective illustration of a single support element used in the storage and display apparatus of FIGS. 4A and 4B;

FIG. 6 is a cut-away side view of storage and display apparatus employing a single cam member mounted onto a pulley system;

DETAILED DESCRIPTION OF THE INVENTION

Figure 3A:
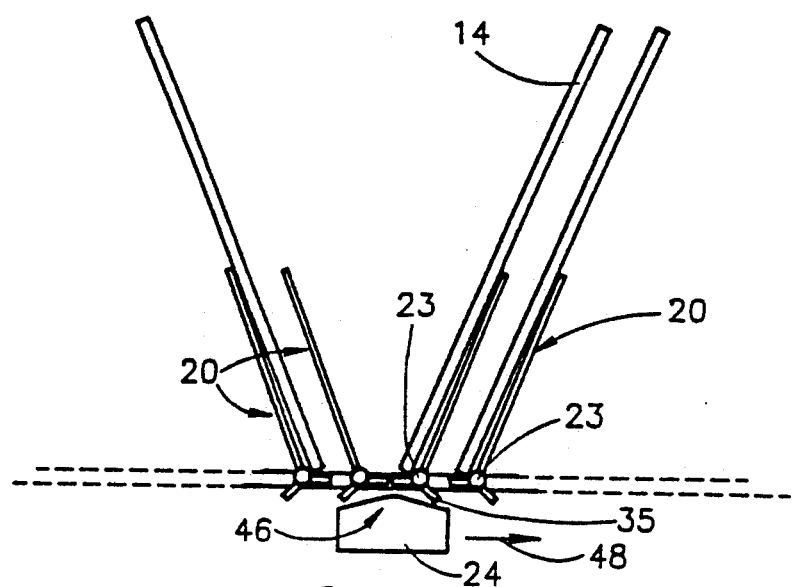
FIGS. 3A-3C illustrate the rotation and display of a single object stored in the storage and display apparatus of FIGS. 1A and 1B.

Reference is made to FIGS. 1A and 1B, which illustrate storage and display apparatus for flat objects, such as floppy diskettes and compact discs. The apparatus, referenced generally 10, includes a boxlike container 12 for storing a plurality of the flat objects, indicated at 14. Mounted within the container 12 is apparatus 16 (FIG. 1B) for successively rotating each of the objects 14 between first and second relatively inclined positions, shown generally at 13 and 15 respectively, so as to display a selected surface 18 of each object. The rotation of each stored object 14 causes virtually the entire surface 18 of each object to be displayed. As this virtually maximizes the amount of visual information available to a person searching for a particular object it greatly eases the search for a specific object 14 stored among a plurality of the objects.

Referring now also to FIG. 2, apparatus 16 includes a plurality of spaced apart support elements 20 mounted by a plurality of parallel pivot members 22 into a mounting member 19 (FIGS. 1A and 1B). Each support element 20 is configured to support a single object 14 in either of the first or second positions as may be defined by transverse stop members 21 forming part of, or mounted onto mounting member 19. Each support element 20 may be rotated about a pivot axis 23, defined by pivot member 22, by engagement with a cam member 24 (FIG. 1B).

In the shown embodiment, each support element defines a first portion 26 extending away from base 28 of the container 12 and a second portion 30 extending towards base 28. In the present example, the second portion 30 of each support element 20 defines first and second leg-like protrusions, referenced 33 and 35 respectively. The cam member 24 is mounted, via a threaded bore 31 (FIG. 1B), onto a drive screw 32 rotatable about a fixed axis 34 extending through a lower portion of the container and oriented transversely to the pivot members 22. Rotation of a knob or handle 36 (FIG. 1B) mounted externally of the container, causes rotation of drive screw 32 via first and second gear wheels 38 and 40. As cam member 24 has a bottom surface 42 which engages bottom surface 44 of the container, the rotational motion of the drive screw 32 causes a linear translation of cam member 24 along axis 34.

As shown in FIG. 1B, cam member 24 defines a single cam portion 46 which is operative to engage either of respective first or second protrusions 33 and 35 of downwardly extending portion 30 of an adjacent support element.

Figure 3B:
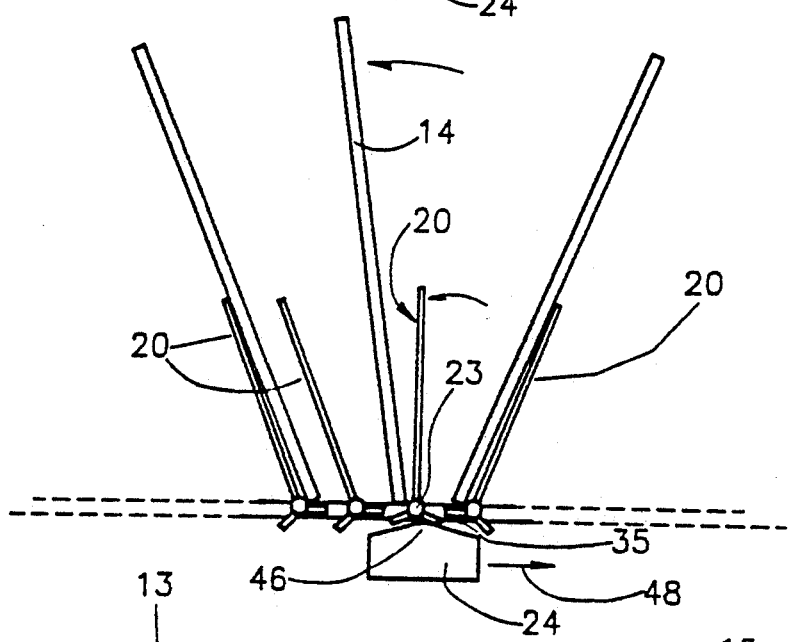
Figure 3C:
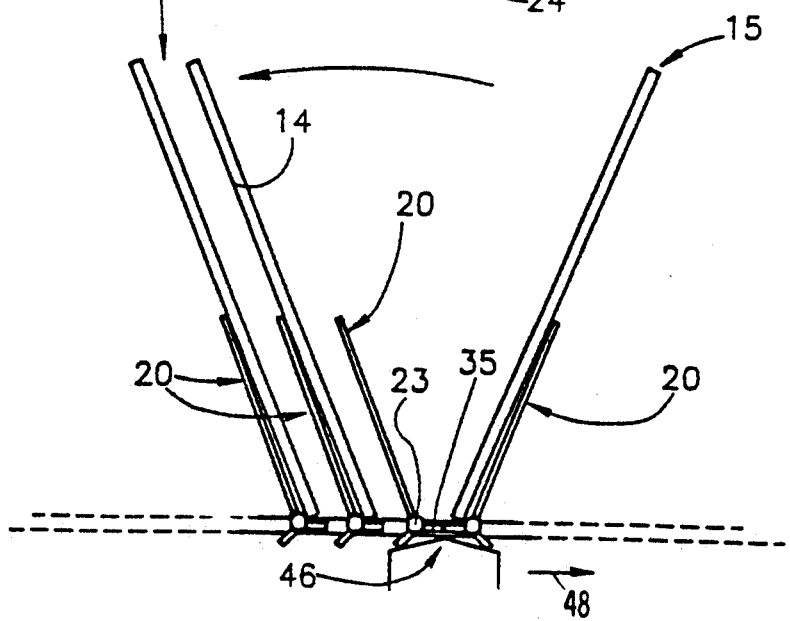

Referring now to FIGS. 3A-3C, the operation of the apparatus of FIGS. 1A and 1B is described. As cam member 24 is moved in the direction indicated by arrow 48, cam portion 46 is brought into engagement with second protrusion 35 so as to cause the entire associated support element 20 to rotate about pivot axis 23. The object 14 hitherto supported by support element 20 in a first portion is, therefore, also rotated and comes to rest on an adjacent support element in a first portion 13.

According to a preferred embodiment of the invention, cam portion 46 has a pair of sloped surfaces 50 (FIG. 1B) which terminate in a rounded peak 52. It will be appreciated that this reduces the possibility of the cam member 24 becoming jammed with a portion of a support element 20 in an intermediate position. Alternatively, or in addition, either one of protrusions 33 and 35 may be weighted, so as to impart an inherent instability to the support element.

Referring once again to FIGS. 1B and 2, as the first and second protrusions 33 and 35 lie along coplanar axes 33″ and 35″ (FIG. 2), in order to permit adequate clearance between facing first and second protrusions 33 and 35 of adjacent support elements 20, the spacing $S_1$ (FIG. 1B) between adjacent pivot axes 23 must be slightly greater than the combined width $W_1$ of first and second protrusions 33 and 35.

Figure 4B:
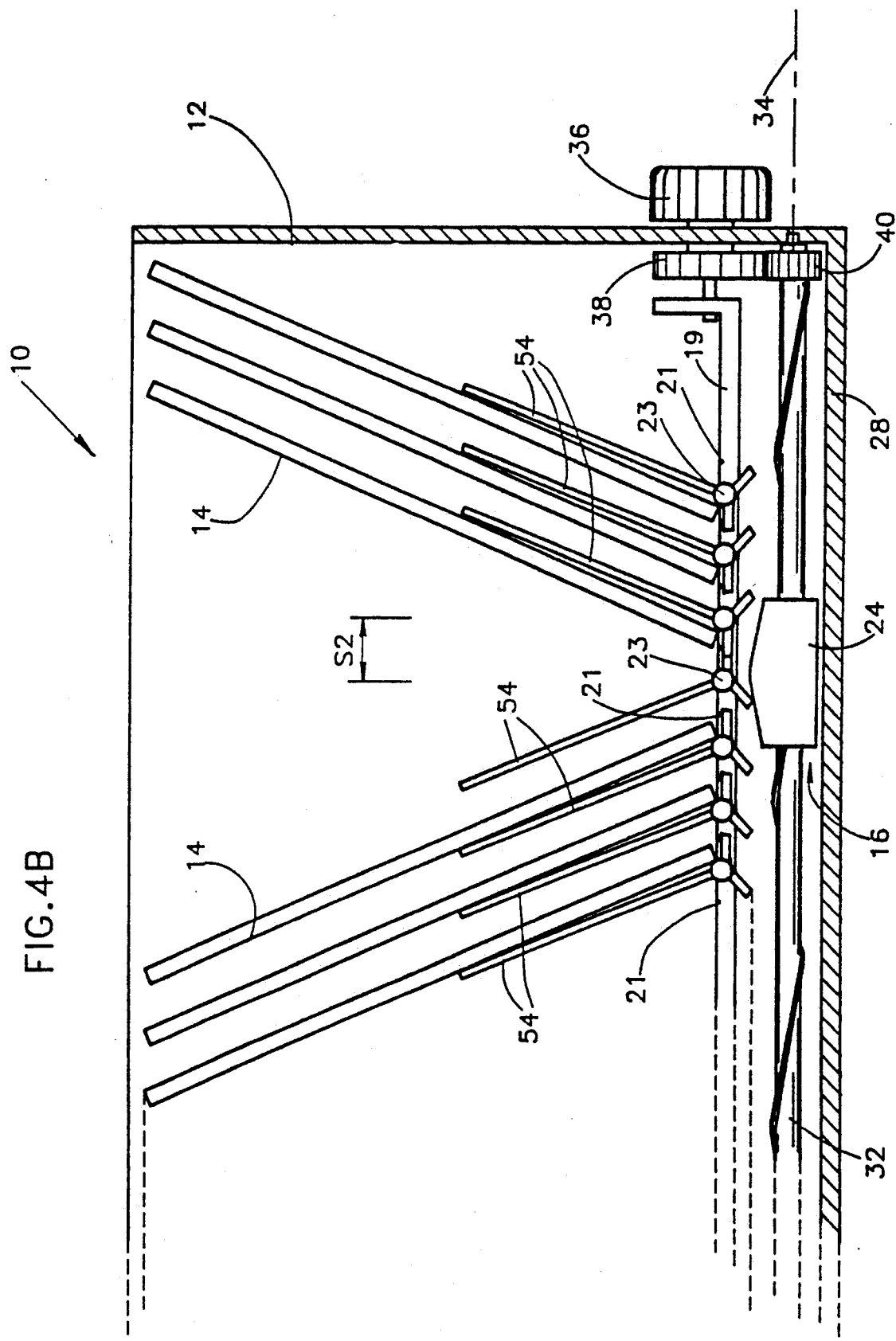

Reference is now made briefly to FIGS. 4A and 4B, which illustrate apparatus 10 of the invention, but wherein the support elements 54 employed are as shown in FIG. 5. According to the present embodiment, respective first and second protrusions 56 and 58 of support elements 54 are staggered along the pivot axis 23, such that protrusions 56 and 58 lie along non-coplanar axes 56″ and 58″ (FIG. 5). In order to permit adequate clearance between facing first and second protrusions 56 and 58 of adjacent support elements 54, the spacing $S_2$ (FIG. 4B) between adjacent pivot axes 23 is required to be slightly greater than the width $W_2$ of only a single one of first and second protrusions 33 and 35 plus the thickness of pivot member 22. It will be appreciated, therefore, that a larger number of support elements may be mounted, and consequently, a larger number of objects may be stored, in a container 12 constructed according to the present embodiment, than according to the embodiment of FIGS. 1A-2.

In addition, whereas the maximum length of first and second protrusions 33 and 35 (FIGS. 1B and 2) is equal to half of the spacing between adjacent pivot members 22, the described staggering of the protrusions 56 and 58 (FIGS. 4B and 5) permits their length to be equal to the entire spacing between adjacent pivot members, such that for spacing $S_2=S_1$, the protrusions 56 and 58 may be approximately twice the length of protrusions 33 and 35 and constitute, therefore, lever arms twice the length of their non-staggered counterparts. Accordingly, the rotation apparatus 16 constructed according to the present embodiment, employing staggered protrusions, allows for less accurate dimensions than are required with the embodiment of FIGS. 1A-2.

FIG. 6 illustrates storage and display apparatus similar to that shown and described above in conjunction with FIGS. 1A, 1B, 4A and 4B, but employing a cam member 60 that is movable along axis 62 via a drive belt 68 to which it is attached and which forms part of a pulley system 64. A desired direction of movement of cam member 60 is achieved by rotation of handle 36 mounted externally of the container, which causes rotation of pulley wheel 66 via first and second cooperating helical gears 39 and 41, so as to drive the belt 68. Pulley wheel 66 is mounted coaxially with helical gear 41 about an axis 70 which is perpendicular to axis 62.

Figure 7:
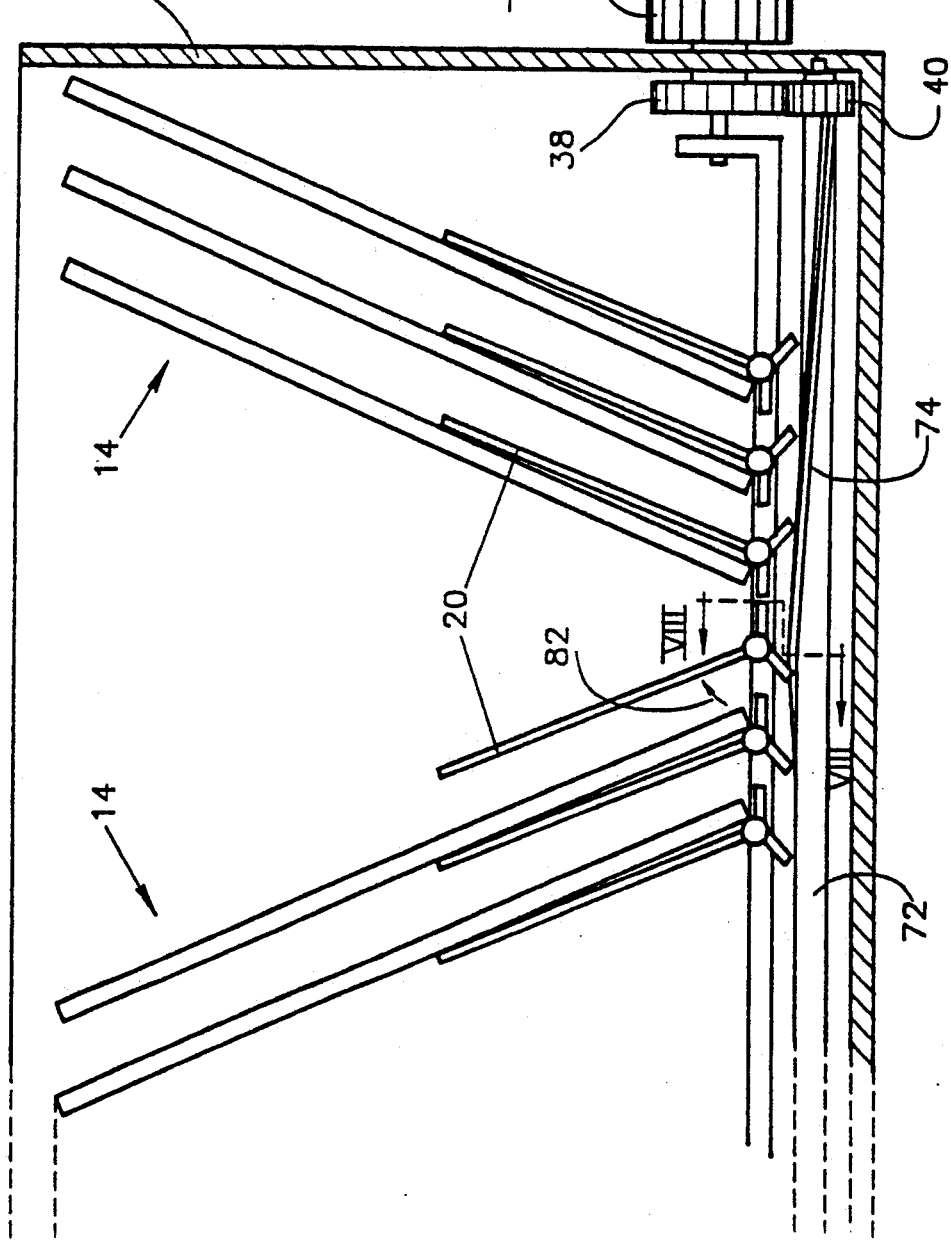
FIG. 7 is a cut-away side view of storage and display apparatus employing a 360° turn helical cam member.

Reference is now made to FIG. 7, which illustrates storage and display apparatus similar to that shown and described above in conjunction with FIGS. 1A and 1B, but, in place of the drive screw 32 and the cam member 24, the present embodiment employs an elongate, axially rotatable rod member 72, having a helical cam element 74. Helical cam element 74 undergoes a rotation of 360° along the length of the container 12.

Figure 8:
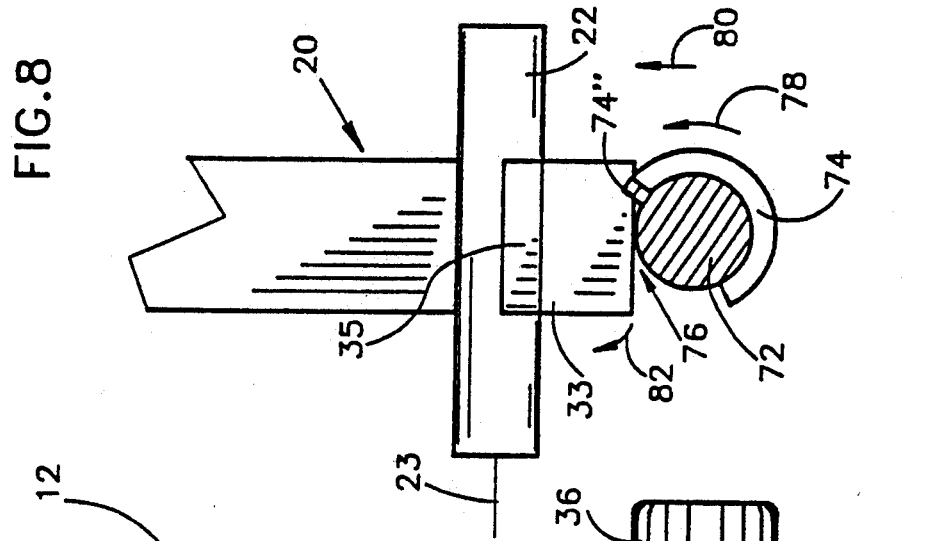
FIG. 8 is an enlarged view taken along line VIII—VIII in FIG. 7.

Accordingly, as the rod member 72 is axially rotated, respective predetermined portions of the helical cam member 74 are rotated upwards, (as seen in the orientation of the apparatus illustrated in FIG. 7) so as to engage a predetermined protrusion of each corresponding support element 20. This is shown particularly clearly in FIG. 8, in which a hatched portion 74″ of the helical cam member 74 is shown to be engaging a first protrusion 33 of support element 20. As rod member 72 is rotated in the direction indicated by arrow 78, portion 74″ undergoes a motion having, inter alia, an upward component, indicated by arrow 80, so as to engage an edge portion 76 of first protrusion 33 of the support element 20.

As rod member 72 is rotated further, the first protrusion 33 of the support element 20 is rotated as indicated by arrow 82 (also shown in FIG. 7). Accordingly, the entire support element 20 is rotated about its pivot axis 23.

Figure 9:
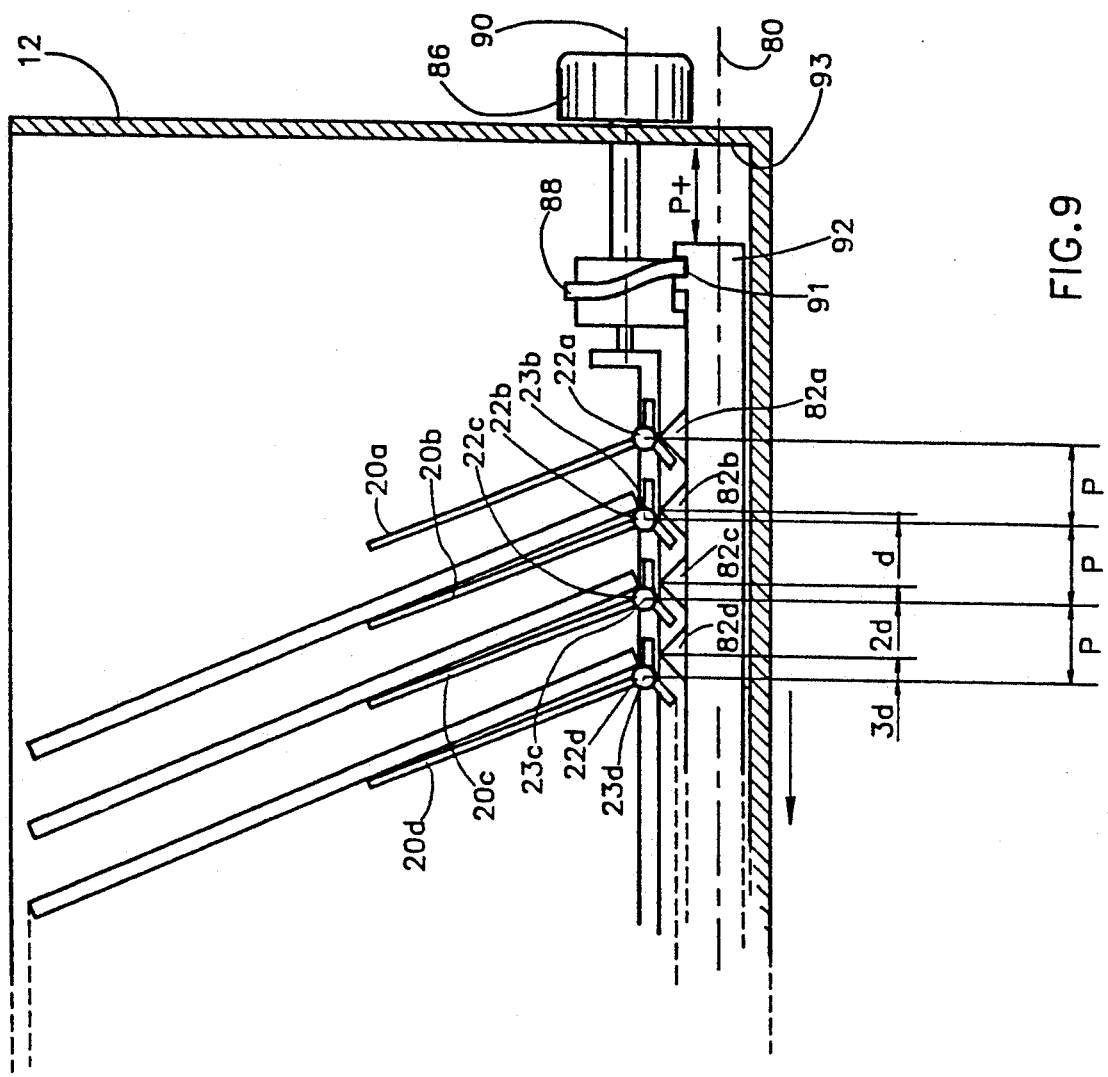
FIG. 9 is a cut-away side view of storage and display apparatus employing a cam member defining a plurality of cam portions.

Reference is now made to FIG. 9, which illustrates storage and display apparatus having a container 12 and support elements 20 as shown and described above in conjunction with FIGS. 1A and 1B, but wherein there is provided a cam member 78 mounted for movement along its longitudinal axis 80 and having a plurality of differently spaced cam portions 82a, 82b, 82c, 82d, . . .

According to the illustrated embodiment, the plurality of support elements 20 are distributed at a pitch 'p' as measured parallel to axis 80, and the cam portions 82a-82d are spaced at uniformly increasing intervals so that first protrusions 33 of adjacent support elements 20a, 20b, 20c and 20d are successively engaged by their corresponding cam portions 82a-82d. For purposes of clarity, the pivot members 22 are indicated on the drawing as 22a, 22b, 22c and 22d, and are illustrated as defining respective pivot axes 23a, 23b, 23c and 23d.

According to the present embodiment, when the first cam portion 82a is in alignment with pivot axis 23a, along axis 80, cam portion 82a is spaced from its corresponding pivot member axis 22b by a distance d; cam portion 82c is spaced from its corresponding pivot member axis 22c by a distance 2d; and cam portion 82d is spaced from its corresponding pivot axis 22d by a distance 3d, where d=P/N, N being the total number of support elements.

It will thus be appreciated that when there are N support elements 20 arranged at a pitch P, the spacing between the nth cam portion and the (n-1)th cam portion equals:

$$P-[d\times(N-1)].$$

Quality d is typically very small, and in order to permit satisfactory operation of the present embodiment of the invention, there is provided, in the present example, a knob or handle 86 having a radius that is relatively large when compared to d. Knob 86 is operative to rotate 360° turn helical cam 88 about an axis 90. The helical cam is operative to engage an end groove defined 91 defined by elongate cam member 78 so as to move it in a selected axial direction and so as to provide successive rotation of support elements 20. As shown, the end 92 of cam member 78 is spaced from an adjacent wall portion 93 of container 12 by a distance equal to at least P.

Figure 10:
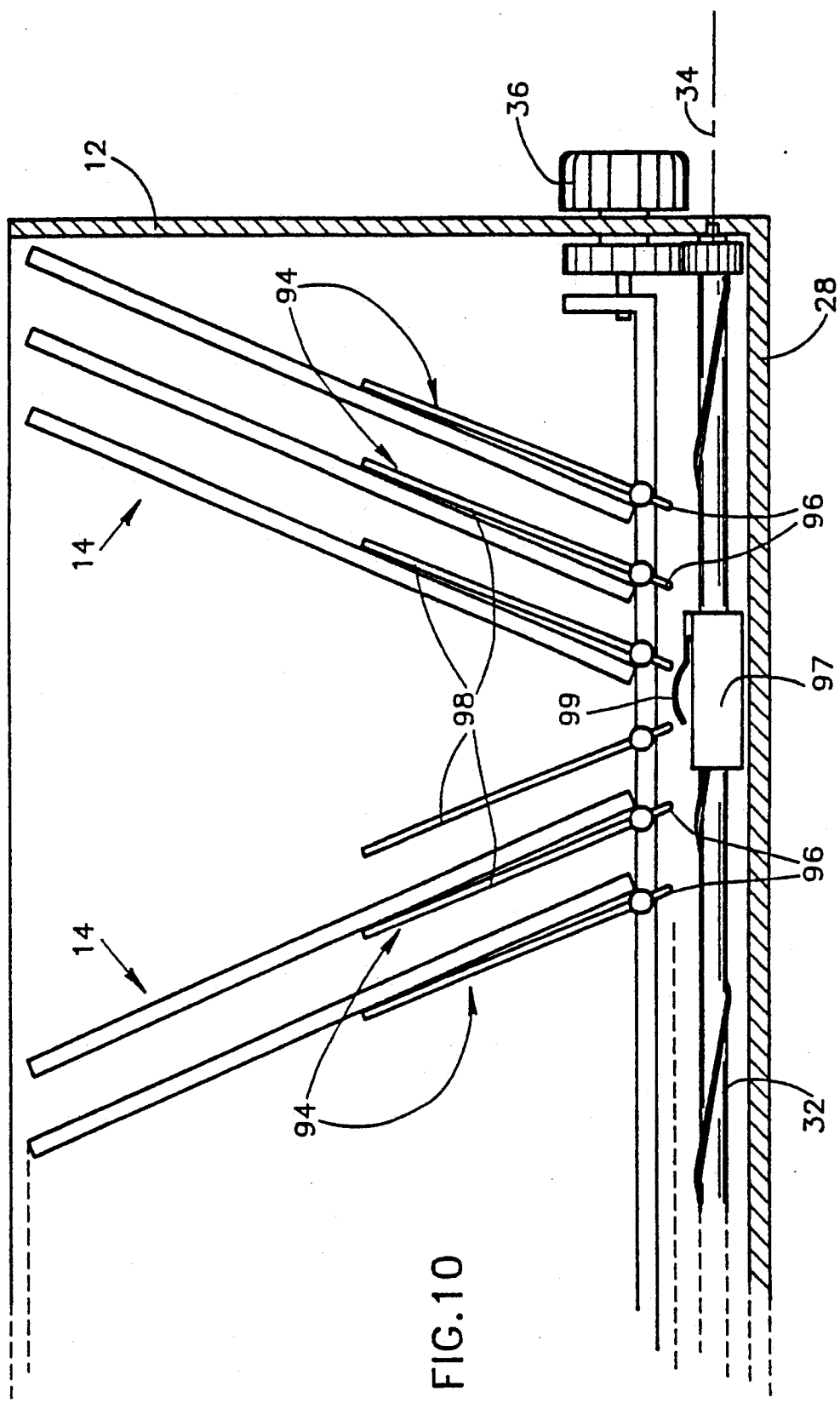
FIG. 10 is a cut-away side view of storage and display apparatus generally similar to that illustrated in FIGS. 1A, 1B, 4A and 4B, but employing support elements constructed according to yet a further alternative embodiment of the invention.

Reference is now made briefly to FIG. 10, in which there is illustrated an embodiment of the invention similar to that of FIGS. 1A and 1B, but employing support elements 94, which have a different configuration to that of support elements 20 of the embodiment of FIGS. 1A and 1B. According to the present embodiment, each support element 94 has a planar protrusion 96 extending towards base 28 of the container and a larger planar portion 98 extending away from base 28. Typically, protrusion 96 and portion 98 are coplanar.

A further difference between the present embodiment and that of FIGS. 1A and 1B, is that in the present embodiment, a cam member 97 is employed in place of cam member 24 (FIG. 1B). As illustrated, cam member 97 includes an upper cam portion 99 of a flexible construction. Portion 99 may, for example, be a leaf spring. This flexibility is required so as to permit passage of the cam member past protrusion 96 of a support element 94 which are required to be overlapping at all times so as to enable mutual engagement when the cam member is travelling in either direction along axis 34. Alternatively, protrusions 96 may have a flexible construction while the cam member has a construction similar to that of cam member 24 (FIG. 1B).

Figure 11:
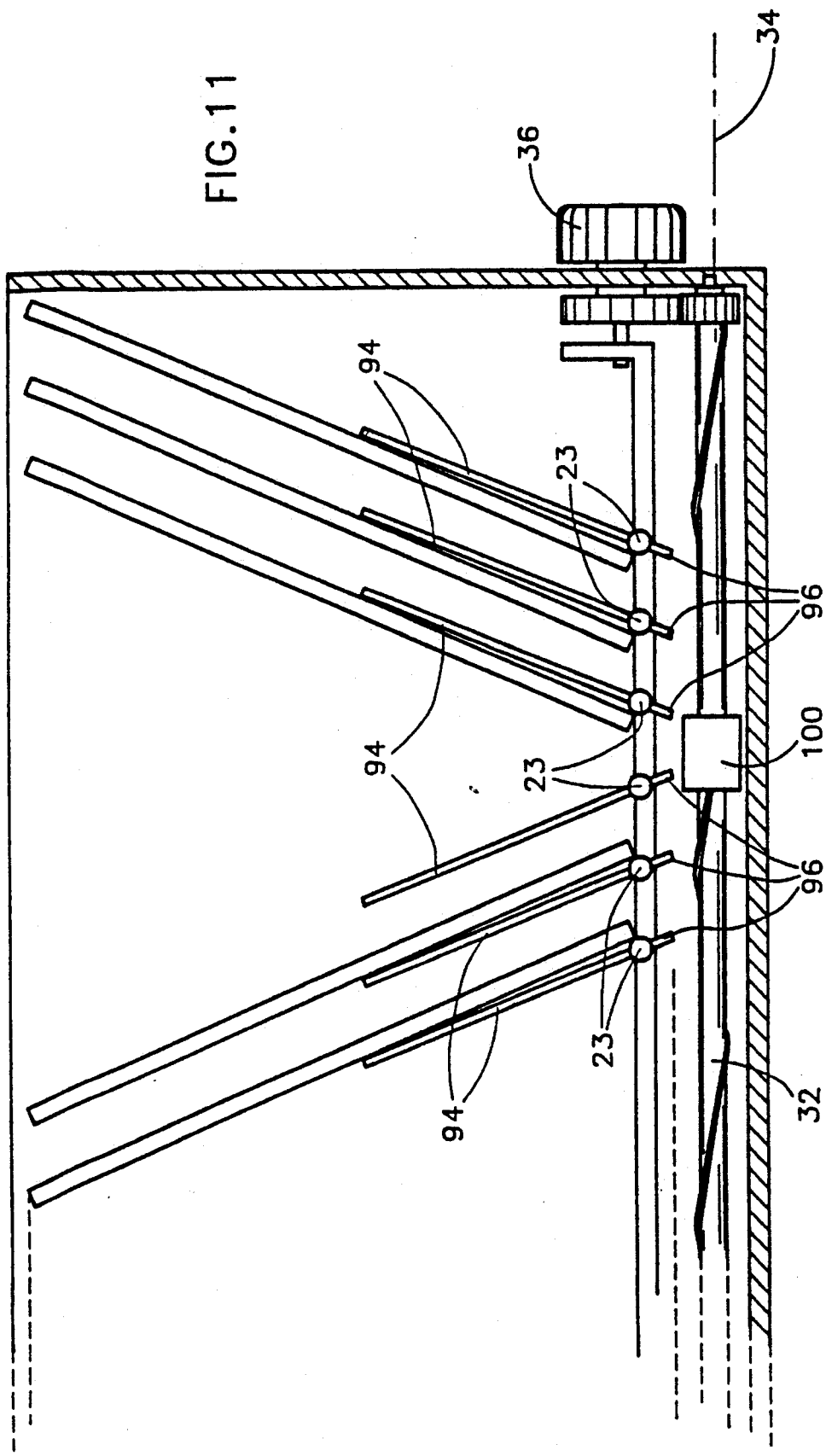
FIG. 11 is a cut-away side view of storage and display apparatus employing magnetic rotation apparatus.

Referring now to FIG. 11, there is shown a storage and display system similar to that illustrated in FIG. 10, but wherein a magnetic displacement member 100 is provided, and protrusions 96 of support elements 94 are made of a magnetic material, typically a ferromagnetic material. As magnetic member 100 is displaced along axis 34, it exerts a magnetic force on a corresponding support element 94 via its magnetic protrusion 96, so as to cause rotation of the support element about its pivot axis 23, thereby causing a similar rotation of an object 14 supported thereby. A particular advantage of the illustrated embodiment is that as it employs a non-contact method of rotationally engaging the support elements, there is a reduced risk of jamming occurring between a support element and the displacement (cam) member.

Figure 12:
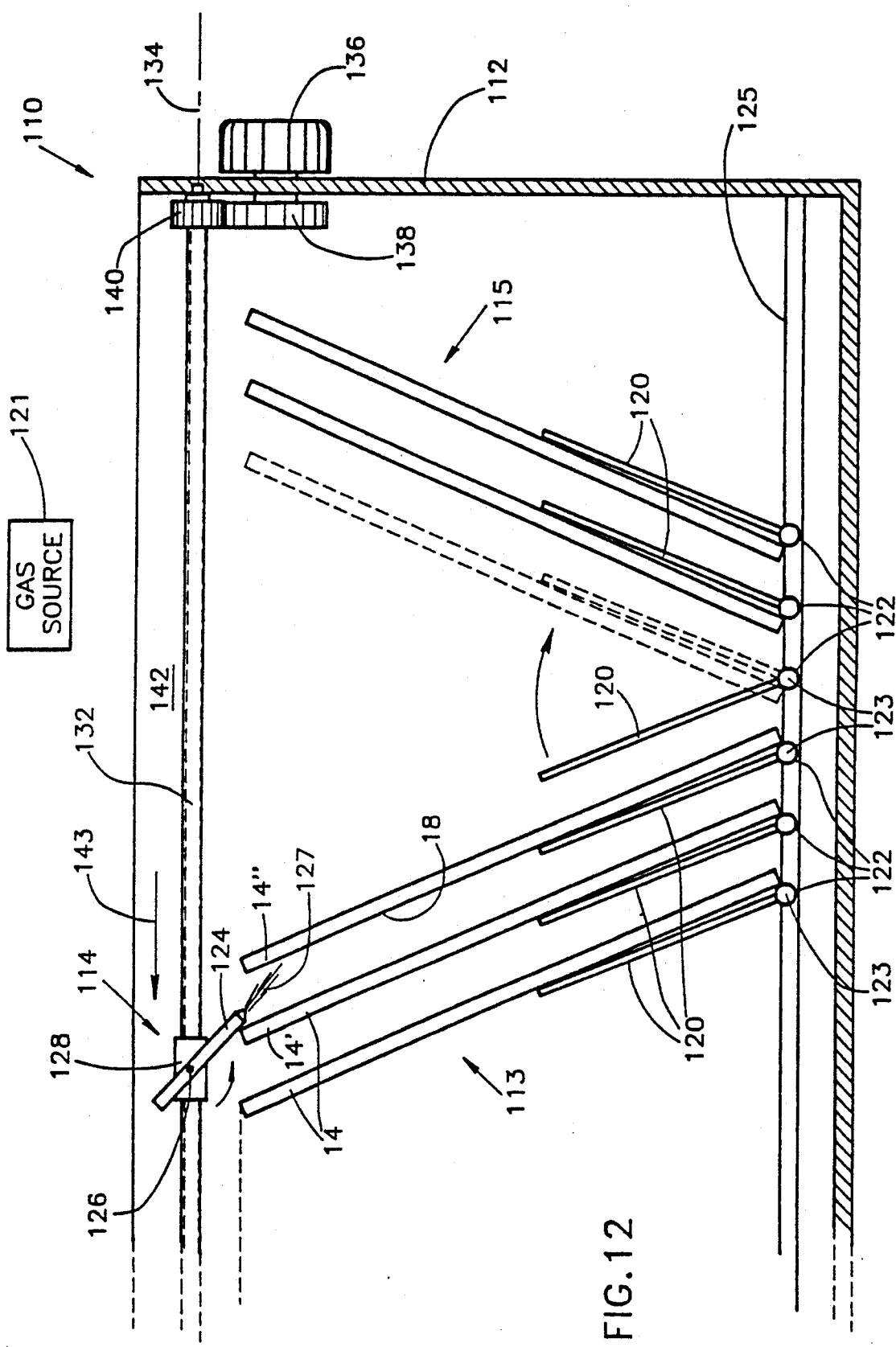
FIG. 12 is a cut-away side view of storage and display apparatus employing gas jet rotation apparatus.

Referring generally now to FIG. 12, there is illustrated storage and display apparatus 110 for flat objects, constructed in accordance with yet further embodiments of the invention. Apparatus 110 employs a container 112, in association with which is mounted gas jet apparatus 114 for successively rotating each of the objects 14 between first and second relatively inclined positions, shown generally at 113 and 115 respectively, so as to display a selected surface 18 of each object. As described above in conjunction with the embodiment of FIGS. 1A and 1B, the rotation of each stored object 14 causes virtually the entire surface 18 of each object to be displayed.

According to the illustrated embodiment apparatus 110 includes a plurality of spaced apart support elements 120 mounted onto a plurality of parallel pivot members 122 defining pivot axes 123 and mounted onto a mounting member 125. Each support element 120 is configured to support a single object 14 in either of the first or second positions, and may be rotated about its pivot axis 123 by the rotation of an object 14 supported to the rear of the support element 120. Rotation of the supported object is achieved by application thereto of a high pressure jet of gas provided by gas jet apparatus 114.

In the illustrated embodiment, the gas jet apparatus includes a nozzle 124, mounted for free rotation about an axis 126 extending through a carriage member 128. The carriage member 128 is mounted, via a threaded bore (not shown) onto a drive screw 132 rotatable about a fixed axis 134 extending through an upper portion of the container and oriented transversely to the pivot axes 123. Rotation of a knob or handle 136 mounted externally of the container, causes rotation of drive screw 132 via first and second gear wheels 138 and 140. Typically, carriage member 128 is prevented from rotation about axis 134 by means of a surface (not shown) arranged for sliding travel along a side portion 142 of the container. Accordingly, rotation of the drive screw 132 causes a linear translation of carriage member 128 along axis 134.

As carriage member 128 is moved, for example, in the direction indicated by arrow 143, gas nozzle 124 engages an edge of one of the stored objects, referenced 14', and is thus pivoted about axis 126. Once the gas nozzle is rotated to a predetermined angle, a high pressure jet 127 of gas is provided so as to exert a force on the object immediately in front, referenced 14", so as to cause its rotation from first inclined position 113 to second inclined position 115. As the object 14" is thus rotated, it rotatably engages the support element 120' immediately in front of it. Typically, although not necessarily, the gas used is filtered air provided from a source 121, which may be, for example, any suitable light duty compressor known in the art.

According to an alternative embodiment, however, support elements 120 are not provided, and each object 14 rests on an adjacent object and, when rotated, therefore, its rotation between the first and second positions is unobstructed.

Figure 13:
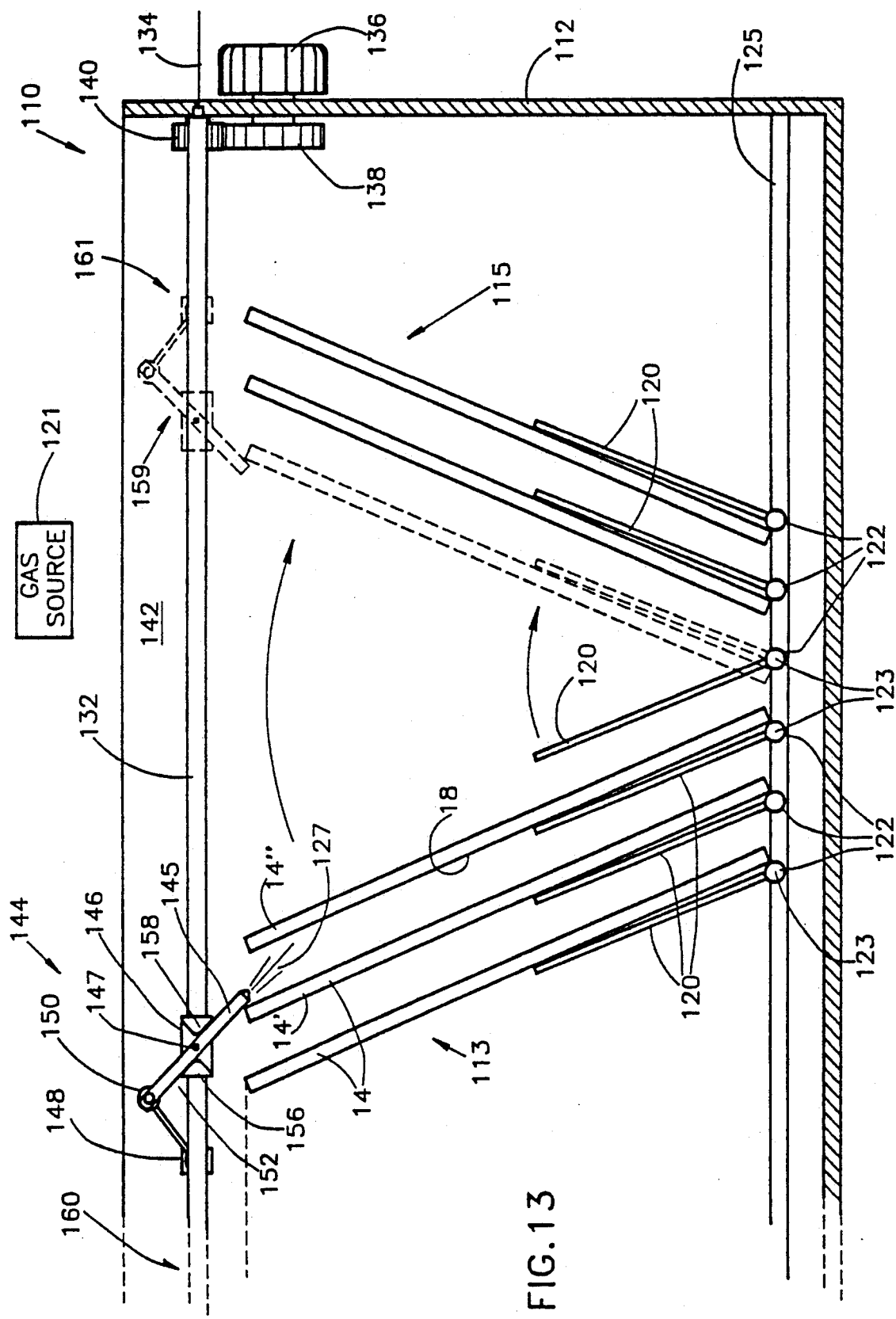
FIG. 13 is a cut-away side view of storage and display apparatus employing gas jet rotation apparatus constructed according to an alternative embodiment of the invention.

FIG. 13 illustrates storage and display apparatus similar to that shown in FIG. 12, but wherein the gas jet apparatus, referenced generally 144, includes a gas jet nozzle 145 mounted onto a carriage 146 is configured to slide freely along drive screw 132. Carriage 146 is drawn along the drive screw 132 by an internally threaded, generally C-shaped leader 148. Leader 148 is typically mounted between the drive screw 132 and portion 142 of the container. Alternatively, portion 142 may be replaced by a track member (not shown) parallel to the drive screw and extending along the length of the container. Carriage 146 and leader 148 are connected via an articulated connection 150, so as to enable movement of the gas jet apparatus in either direction along the axis 134.

In contrast to the embodiment of FIG. 12, gas nozzle 145 is not brought into touching engagement with the stored objects 14, but is instead inclined, according to the direction of travel, in either of two predetermined positions 152 and 154 defined by stop members 156 and 158 formed on carriage 146. The gas nozzle 145 provides a gas of jet so as to rotationally displace an engaged object 14 as described above in conjunction with the embodiment of FIG. 12.

In the position illustrated, gas jet apparatus 144 is being displaced along axis 134 towards a first end 160 of drive screw 132. To reverse the direction of movement of the apparatus 144 such that it travels towards a second end 161 of the drive screw, the direction of rotation of drive screw 132 is reversed.

Figure 14A:
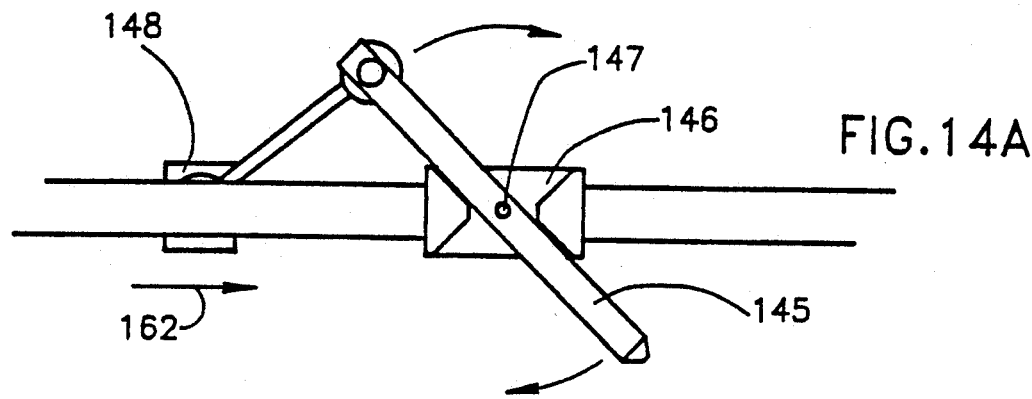
FIGS. 14A-14D are diagrammatic illustrations of the reversal in direction of the gas jet apparatus of FIG. 13.
Figure 14B:
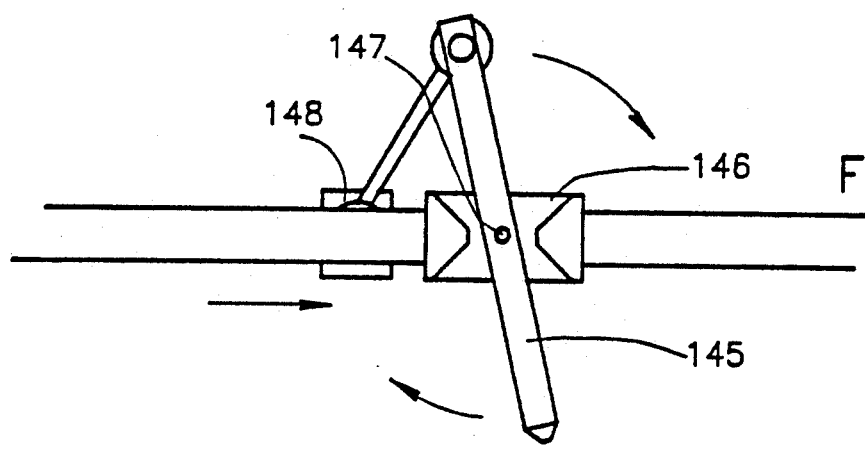
Figure 14C:
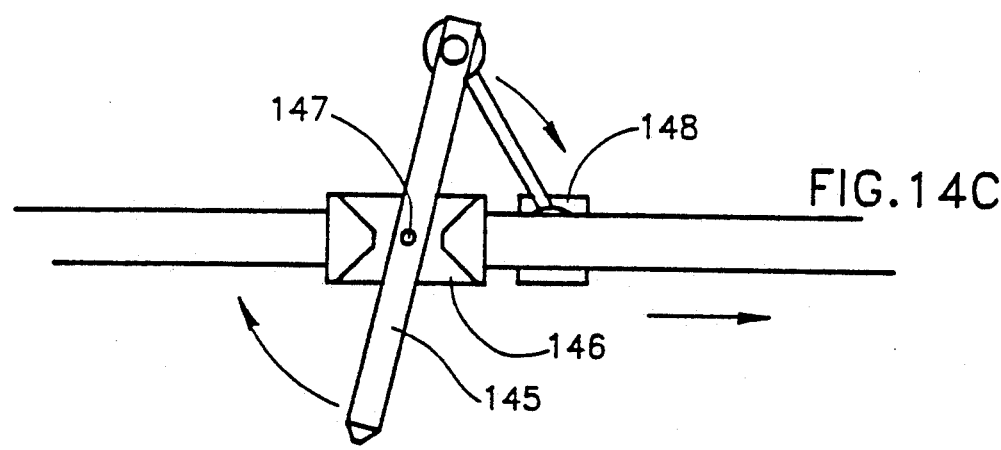
Figure 14D:
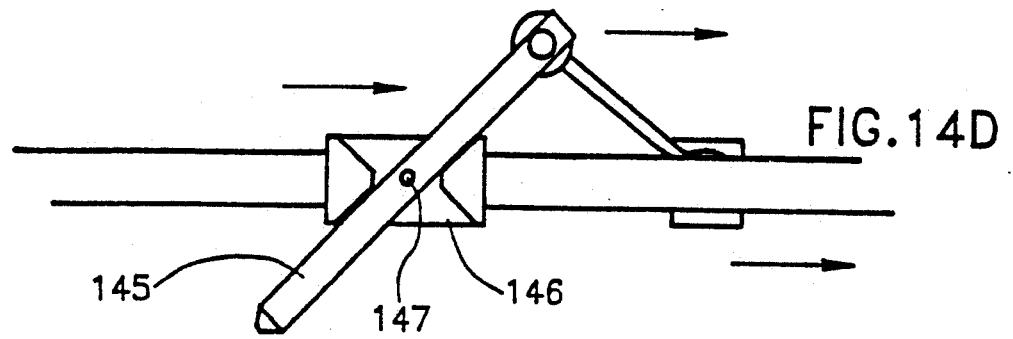

As illustrated in FIGS. 14A-14D, as the direction of movement of leader 148 is reversed, as indicated by arrow 162 (FIG. 14A), leader 148 moves towards carriage 146 while gas nozzle 145 is rotated clockwise (in the illustration) about axis 147 until leader 148 passes the carriage 146 and eventually takes up the position shown in FIG. 14D. At this position, further rotation of gas nozzle 145 is prevented by stop members 156 and 158 and so uniform movement of the entire gas jet apparatus 144 towards the second end 161 of drive screw 132 may commence.

As with the embodiment of FIG. 12, the present embodiment also, does not necessarily include support elements 120 and each object 14 rests on an adjacent object and, when rotated, therefore, its rotation between the first and second positions is unobstructed.

It will be appreciated by persons skilled in the art that the scope of the present invention is not limited to what has been specifically shown and described hereinabove by way of example. The scope of the present invention is limited, rather, solely by the claims, which follow.

I claim:

1. Storage apparatus for flat objects comprising:
   a. a container configured to hold a plurality of flat object;
   b. means associated with said container for selectably rotating successive ones of the objects between first and second positions so as to display a selected surface of each successively rotated object;
   c. said means associated with said container for selectively rotating successive ones of the objects further comprising a plurality of spaced apart support elements mounted for rotation about a plurality of respective, parallel pivot axes, each said support element being configured to support a single flat object in either of said first or second positions;
   d. means for selectably engaging successive support elements so as to cause pivoting thereof about said pivot axes so as to rotate successive ones of the flat objects between said first and second positions;
   e. said container including a base and said plurality of pivot axes being oriented generally parallel to said base, each support element defining a support portion extending generally away from said base and further defining a protrusion extending from said pivot axis towards said base, said means for selectably engaging being operable to successively engage each said protrusion so as to cause said pivoting of each said support element;
   f. said means for selectably engaging successive support elements comprising an engagement element mounted for translation along an axis transverse to said pivot axes so as to successively engage and cause said pivoting of each said support element; and
   g. means for selectably displacing said engagement element along said transverse axis.

2. Apparatus according to claim 1, and wherein said engagement element comprises a movable cam member configured to engage each said protrusion.

3. Apparatus according to claim 2, and wherein said movable cam member defines a single cam.

4. Apparatus according to claim 3 and wherein said cam defines an internally threaded bore and said means for selectably displacing comprises:
   a drive screw mounted along said transverse axis and extending through said threaded bore so as to engage said cam; means for rotating said drive screw; and
   means for preventing rotation of said cam about said drive screw so as to cause linear translation of said cam along said drive screw and thereby cause successive engagement of said protrusions of said support elements by said cam.

5. Apparatus according to claim 3, and wherein said means for selectably displacing comprises pulley means to which said cam is attached.

6. Apparatus according to claim 5, and wherein said helical member undergoes a single rotation of 360° between said first and second ends of said rotatable member.

7. Apparatus according to claim 2, and wherein said movable member comprises an elongate cam member mounted for movement along its longitudinal axis and defining a plurality of cam portions equal to the number of said support elements and arranged along said cam member so as to successively engage and rotate predetermined support elements.

8. Apparatus according to claim 7, and wherein said pivot axes are uniformly spaced and said plurality of cam portions are spaced along said cam member at uniformly varied distances. the variation in the spacing being a predetermined proportion of the spacing between said pivot axes.

9. Storage apparatus for flat objects comprising:
   a. a container configured to hold a plurality of flat objects;
   b. means associated with said container for selectably rotating successive ones of the objects between first and second positions so as to display a selected surface of each successively rotated object;
   c. said means associated with said container for selectively rotating successive ones of the objects further comprising a plurality of spaced apart support elements mounted for rotation about a plurality of respective, parallel pivot axes, each said support element being configured to support a single flat object in either of said first or second positions;
   d. means for selectably engaging successive support elements so as to cause pivoting thereof about said pivot axes so as to rotate successive ones of the flat objects between said first and second positions;
   e. said container including a base and said plurality of pivot axes being oriented generally parallel to said base, each support element defining a support portion extending generally away from said base and further defining a protrusion extending from said pivot axis towards said base, said means for selectably engaging being operable to successively engage each said protrusion so as to cause said pivoting of each said support element;
   f. said means for selectably engaging successive support elements comprising an engagement element mounted for translation along an axis transverse to said pivot axes so as to successively engage and cause said pivoting of each said support element; and
   g. means for selectably displacing said engagement element along said transverse axis.

10. Apparatus according to claim 9, wherein said engagement element comprises a movable cam member configured to engage each said protrusion.

11. Apparatus according to claim 10, wherein said movable cam member defines a single cam.

12. Apparatus according to claim 11, wherein said cam defines an internally threaded bore and said means for selectably displacing comprises:
   a. a drive screw mounted along said transverse axis and extending through said threaded bore so as to engage said cam;
   b. means for rotating said drive screw; and
   c. means for preventing rotation of said cam about said drive screw so as to cause linear translation of said cam along said drive screw and thereby cause successive engagement of said protrusions of said support elements by said cam.

13. Apparatus according to claim 11, wherein said means for selectably displacing comprises pulley means to which said cam is attached.

14. Apparatus according to claim 13, wherein said helical member undergoes a single rotation of 360 degrees between said first and second ends of said rotatable member.

15. Apparatus according to claim 10, wherein said movable member comprises an elongate cam member mounted for movement along its longitudinal axis and defining a plurality of cam portions equal to the number of said support elements and arranged along said cam member so as to successively engage and rotate predetermined support elements.

16. Apparatus according to claim 15, wherein said pivot axes are uniformly spaced and said plurality of cam portions are spaced along said cam member at uniformly varied distances, the variation in the spacing being a predetermined proportion of the spacing between said pivot axes.

17. Storage apparatus for flat objects comprising:
a. a container configured to hold a plurality of flat objects;
b. means associated with said container for selectably rotating successive ones of the objects between first and second positions so as to display a selected surface of each successively rotated objects;
c. said means for selectably rotating further comprising a plurality of spaced apart support elements mounted for rotation about a plurality of respective, parallel pivot axes, each said support element being configured to support a single flat object in either of said first or second positions;
d. means for selectably engaging successive support elements so as to cause pivoting thereof about said pivot axes so as to rotate successive ones of said flat objects between said first and second positions;
e. said means for selectably engaging further comprising an engagement element mounted to a drive element for translation along an axis transverse to said pivot axes so as to successively engage and cause said pivoting of each said support element; and
f. means for selectably displacing said engagement element along sid transverse axis.

* * * * *